United States Patent [19]

Regueiro

[11] Patent Number: 5,392,744
[45] Date of Patent: Feb. 28, 1995

[54] PRECOMBUSTION CHAMBER FOR A DOUBLE OVERHEAD CAMSHAFT INTERNAL COMBUSTION ENGINE

[75] Inventor: Jose F. Regueiro, Rochester Hills, Mich.

[73] Assignee: Chrysler Corporation, Highland Park, Mich.

[21] Appl. No.: 30,964

[22] Filed: Mar. 12, 1993

[51] Int. Cl.⁶ .............................. F02B 19/18
[52] U.S. Cl. ................... 123/262; 123/269; 123/293
[58] Field of Search ............ 123/262, 263, 269, 293

[56] References Cited

U.S. PATENT DOCUMENTS

| | | | |
|---|---|---|---|
| 3,945,365 | 3/1976 | Regueiro | 123/191 |
| 4,111,177 | 9/1978 | Regueiro | 123/32 ST |
| 4,491,104 | 1/1985 | Fujii et al. | 123/293 |
| 4,513,708 | 4/1985 | Latsch et al. | 123/263 |
| 4,619,229 | 10/1986 | Imoto et al. | 123/269 |
| 5,024,193 | 6/1991 | Graze, Jr. | 123/293 |
| 5,067,458 | 11/1991 | Bailey | 123/293 |
| 5,105,780 | 4/1992 | Richardson | 123/263 |

OTHER PUBLICATIONS

Automotive Industries, Jan. 1980—pp. 43 thru 48.
Technology Review, Nov./Dec., 1980—pp. 19 thru 29.
Automotive Engineering, Jun. 1992—pp. 46 thru 47.

Primary Examiner—E. Rollins Cross
Assistant Examiner—Weilun Lo
Attorney, Agent, or Firm—Kenneth H. MacLean

[57] ABSTRACT

A diesel engine (10) has a precombustion chamber (30) with four circumferentially spaced and angled transfer passages (60, 61) leading to the main combustion chamber (44). Each transfer passage (60, 61) is tapered to provide a larger lower end (62) facing the main chamber (44) and smaller upper end (64) facing the pre-combustion chamber (30). Air passing through the passages during the compression stroke undergoes heating and swirling within the pre-combustion chamber. The flame front passing from the precombustion chamber to the main combustion chamber are aimed toward the centers (68 and 69) of respective recessed lobes (20 and 22) within piston (18).

17 Claims, 3 Drawing Sheets

PRECOMBUSTION CHAMBER FOR A DOUBLE OVERHEAD CAMSHAFT INTERNAL COMBUSTION ENGINE

TECHNICAL FIELD

The field of this invention relates to internal combustion engines and more particularly to diesel engines having a pre-combustion chamber.

BACKGROUND OF THE DISCLOSURE

High speed automotive diesel engines capable of 4500 to 5000 r.p.m. that have been in mass production are the Daimler-Benz engine or variations of the Ricardo "Comet" design or the Daimler-Benz diesel engine. The engines have all been 2 valves; OHV or OHC design. Diesel engines have their own distinctive complications due to the high compression ratios needed to run these engines. Firstly, a strong bridge is desired in the cylinder head between the exhaust and intake valves to allow for sufficient strength and for providing a coolant passage.

Secondly, valve lift during valve overlap is reduced due to the small clearance between the valves and the piston at top dead center (TDC) to prevent hitting of the valve into the piston. In theory, the maximum valve lift is in direct proportion to the inner seat diameter of the valve. Further valve lift beyond the calculated maximum valve lift provides for very little additional air flow due to the restriction of the diameter at the throat of the port. The valves on these prior art diesels are made substantially smaller than valves for an equivalent version of a gasoline spark ignition engine to allow for larger valve bridges to withstand the higher diesel firing 1 pressures. The smaller size and reduced lift of the valves gravely affect the volumetric efficiency and air flow of diesel engines, especially prior-art engines with only two valves.

With two-valve engine technology, larger valves and relatively higher valve lift characteristics are used as compared to four-valve engine technology. To achieve relatively higher lift characteristics, proper valve dynamics dictates relatively long periods to open and close the valves. Mechanically, the valve spring are choosen to exert relatively great forces on the valve train components. This increases valve-train friction and causes a power loss. In a typical two-valve pushrod engine, the dynamic weight of the valve train mechanism (cam tappet, pushrod, rocker arm, valve, spring, retainer, and keepers) will be about four times higher per valve than that of the smaller valves of the proposed four-valve design. The proposed design has much smaller and lighter tappets, springs, retainers, and keepers as well as the elimination of rocker arms and pushrods. It is expected that the total valve train friction of the four valve design will be less than half that of the two valve, push rod design.

The valve lift is adversely affected at the critical valve overlap period when the intake valve is beginning to open and the exhaust valve is closing. The limitation of valve lift at this time affects the thorough flushing of the exhaust gases and inhibits the cylinder filling process for the subsequent cycle. The reduced valve lift during the overlap period, and the large valve periods force a late intake closing and an early exhaust opening. A late intake closing reduces the effective compression ratio with detrimental starting and running consequences, and greatly reduces the volumetric efficiency at low speeds. An early exhaust valve opening wastes energy and raises the exhaust gas and exhaust valve temperature which forces the use of more expensive and exotic high temperature valve and seat materials. An early exhaust closing raises the probability of a recompression spike, or "lock-up" at TDC during the scavenging or overlap portion of the cycle at high speed and high load, when in some engines, there is not sufficient real time available for a complete evacuation of the exhaust gases. Recompression spikes, apart from inhibiting the proper gas-flow process and reducing power and volumetric efficiency, consume energy by creating negative work during the exhaust stroke near TDC. The exhaust valve closing must occur late enough during an extended overlap period with the intake valve to prevent a recompression spike near top dead center.

Diesel engines have been able to tolerate these problems at low speeds. The operation at low speed provides sufficient time for the air flow through the intake and exhaust valves to pass into and out of the cylinder even with a delayed intake valve opening or early exhaust valve closing. However, the problems associated with valve timing and air flow lag become magnified at high speeds. The late intake valve opening becomes detrimental and substantially decreases the volumetric efficiency and compression chamber pressure and temperature. The combination of a late intake opening and an early exhaust closing provides for increased risk of a recompression spike at high speed operation. However the high compression ratios of a conventional high-speed I.D.I. diesel engine with the piston at top dead center being very close to the valves dictate that the intake valves cannot be opened early due to crashing into the piston and the exhaust valve cannot be closed late due to the crashing of the piston into the exhaust valve. The unnatural valve timings detract from the potential high-speed capability of this type of diesel engine.

A major compromise of these prior-art high-speed, 2-valve engines results when the valve opening duration must be extended at high speed to improve the volumetric efficiency lost by the lack of proper overlap. In every case, the intake valve closes excessively late in the compression stroke, and the effective compression ratio, effective compression pressure and effective compression temperature are too low even for the high speeds. When such engines run at low speeds, the same applies, but in addition, the volumetric efficiency suffers because the upward piston motion on the compression stroke "spit-back" into the intake manifold the air which has already been admitted into the engine and for which energy has been spent. Negative work (more energy wasted) also results from returning certain amounts of this already-admitted air back into the intake manifold. The situation is further aggravated at cranking speeds, especially cold when the batteries are weak and the oil is thick and said speeds are in the order of 100–150 rpm. The effective compression ratio under said conditions is lowered so much that cold startability is greatly affected or impossible.

Another compromise is when engines attempt to use the same components for both gasoline and diesel engines. In the past, gasoline and diesel engines did not have many components that were interchangeable. Neither engine could be economically and feasibly converted to the other type. Because of the diesel's lower sales volume, the diesel engine becomes more expensive and less desirable.

Lower speed diesel engines having 2600–2800 r.p.m. have been developed with four valves to circumvent the breathing and valve timing problems of their prior art two-valve counterparts. The use of four valves decreases the restriction of air flow through the valve openings. It is common to have a 40% increase in total air flow area as compared to a conventional two-valve engine. Since each valve is smaller compared to a two-valve per cylinder engine, the maximum valve lift can be reduced. The valve stem can also be made smaller in diameter, shorter and with less mass. Because each valve is lighter, the springs can be made softer. The softer springs provide for a more efficient engine. Because there is decreased lift for each valve, the cams on the cam shaft can be contoured, if desired, for less valve duration with reduced valve dynamic problems. Furthermore, the timing in which the valve needs to be open can be shortened because there is less lift to contend with even with the same valve accelerations. A further improvement results from lower exhaust valve temperatures, since each smaller exhaust valve has less ratio of surface area for heat pick-up to seat area for heat rejection. The result is the valves runs much cooler. Furthermore, with the larger valve opening areas but overall smaller diameter valves, the designer can afford to make slightly wider bridges and such bridges are shorter in length, which, added to the lower valve mass and running temperature, results in much lower valve head deflections and longer valve and seat life. Additionally, with shorter valve periods the exhaust valve spends less time open, exposed to the exhaust gases, and more time closed and rejecting heat, which lowers the valve temperature even further.

The few known four-valve diesel engines have a centrally located pre-combustion chamber with a large-diameter transfer passage between the pre-combustion chamber and main combustion chamber. The burn or combustion duration was short enough for these lower speed engines but are not short enough to be adapted to high-speed diesel engines. Furthermore, the pistons in these diesel engines tended to have heat checking and cracking due to the torch-like flame exiting the pre-combustion chamber and impinging at a near perpendicular angle onto the piston surface. These engines suffered from two extra combustion drawbacks: first, by the disposition of their valve train, with pushrods, rocker arms and rocker-arm bridges operating the valves, the two intakes (and the two exhausts) were in an axis transversal to the main axis of the engine and their porting and flow characteristics were not what would be considered appropriate today. With such disposition of the valves, swirl, or rotational air movement about the cylinder axis, was generated and, although swirl may have been beneficial by the general philosophy of the combustion chamber, it was a weak swirl and extracted a high air-flow penalty to generate the swirl. Secondly, the straight transfer passage of the pre-cup did not promote swirled air motion into the pre-cup. The results were increased combustion knock, NOx, hydrocarbons, smoke and particulate than a swirling pre-cup could have provided. Yet, engines from both the Caterpillar and Teledyne Continental Motors were first certified for low emissions by meeting the 1975 truck emission standards, indicating the great improvements to be obtained with more modern technology.

Modifications to pistons have also increased efficiency of engines. Many engines have a piston with a recess to form part of the combustion chamber or to enhance air swirl. The "Comet" diesel engine had a "spectacle-shaped" recess in its piston to form the main combustion chamber. It was not aligned or coordinated with the valves to act as a pocket to increase the clearance between the valves and the piston at TDC. Air tumble, another means of providing in-cylinder air motion (rotating air motion about an axis parallel to the engine centerline), has only been used in gasoline spark ignited engines. What is needed is a high-speed diesel engine with highly improved air flow and power output with lower fuel consumption, smoke, particulates and gaseous emissions, improved startability and reduced combustion noise and harshness, and offering increased durability of valves and piston. Means must be provided to achieve such objectives, such as a direct-acting double overhead camshaft configuration to achieve a lightweight, low stress, low power consumption, stiff and quiet valve train with superior air flow characteristics, and a combustion system capable of accomplishing fast and clean combustion both in the early (pre-combustion, in the pre-combustion chamber) and late (main chamber) combustion. The subject of this patent provides all the elements to achieve such results in a modern, relatively inexpensive engine package, with a possible cylinder head even converted from appropriate gasoline engine counterparts featuring the airflow capacities of a four-valve design with narrow valve-included angle and DOHC, preferably a mechanically stiff direct-acting design with shorter valve periods, increased effective compression ratio and decreased nominal compression ratio, with a highly turbulent mixture generated in the pre-chamber for quick ignition and fast burn, followed by combustion in the main chamber being characterized as a fast process based on a combination of air tumble, squish, mixing with the fuel and products of combustion exiting from the pre-chamber and burning quickly and efficiently by maintaining said pre-chamber products airborne while mixing and burning with the air in the main chamber. The process takes advantage of, and is based on, appropriate recesses incorporated in the piston which, apart from functioning as mini-combustion chambers, also provide for valve pockets to allow for the proper valve events and lifts without combustion or manufacturing compromises, and which contribute to an even thermal loading. The combination of volumetric efficiencies and valve timings providing previously unheard of startability, smooth, quieter combustion and reduced firing pressures, even while producing increased power outputs and lower gaseous and visible emissions.

SUMMARY OF THE DISCLOSURE

In accordance with one aspect of the invention, an internal combustion engine has a cylinder and a piston reciprocally movable in the cylinder. A cylinder head is secured over the cylinder and piston to form a combustion chamber. At least one intake port and preferably two, extend through the cylinder head and an intake valve is mounted at each port through the cylinder head for allowing air to be admitted into the combustion chamber. At least one exhaust port, preferably two, extends through the cylinder head and an exhaust valve is mounted to the cylinder head for allowing exhaust gases to exit the combustion chamber. The valves are preferably operated by directly-operated twin-overhead camshafts. A pre-combustion chamber is in communication with the combustion chamber and houses a heating element (glow plug for cold start). The pre-combustion chamber has a plurality of tapered transfer passages communicating with the combustion chamber. Each passage has a narrow open-end facing the pre-combustion chamber and a wide open-end facing the combustion chamber.

The tapered transfer passages are preferably spaced circumferentially about a central axis of the pre-combustion chamber. The longitudinal axis of each passage is inclined with respect to the central axis of the pre-combustion chamber to provide rotation of air about said central axis. The central axis of the pre-combustion chamber is approximately aligned with a central longitudinal axis of the cylinder. The narrow open-end of a respective passage is rotated about the central axis of the pre-combustion chamber preferably and approximately as much as 90° from the wide open-end of the respective passage.

The piston is domed i.e., higher in the center than on the sides. The angle of the dome preferably similar to the VIA and angle of the fire deck of the cylinder head. The piston has a plurality of recessed lobes in its domed top surface circumferentially spaced about a central axis of the piston. The longitudinal axis of each transfer passage at the wide end is aligned with a center of a respective recessed lobe and is canted with respect to the domed top surface of the piston at an acute angle. Each intake and exhaust valve is vertically aligned over a respective recessed lobe and sized to fit within the recessed lobe when in the partially open position when the piston is near TDC to provide the appropriate valve overlap. In one embodiment, the passages that are aligned with the center of the recessed lobes under respective intake valves have a greater diameter than the passages that are aligned with the recessed lobes under the respective exhaust valves. In another embodiment, the lobes in cross section, have a minimum depth at the outer periphery of the lobes just sufficient to allow proper valve operation without crashing into the pistons. The lobes may be concavely dished to be deeper in the center.

According to another aspect of the invention, the pre-combustion chamber has a plurality of transfer passages communicating with the combustion chamber. A first open end of a respective passage faces the pre-combustion chamber and a second open end of a respective passage faces the combustion chamber. The transfer passages are circumferentially spaced about a central axis of the pre-combustion chamber and have a respective longitudinal axis inclined with respect to the central axis to provide rotation of air about the axis.

BRIEF DESCRIPTION OF THE DRAWINGS

Reference now is made to the accompanying drawings in which.

DETAILED DESCRIPTION OF THE PREFERRED EMBODIMENT

Figures 1, 2, 3:
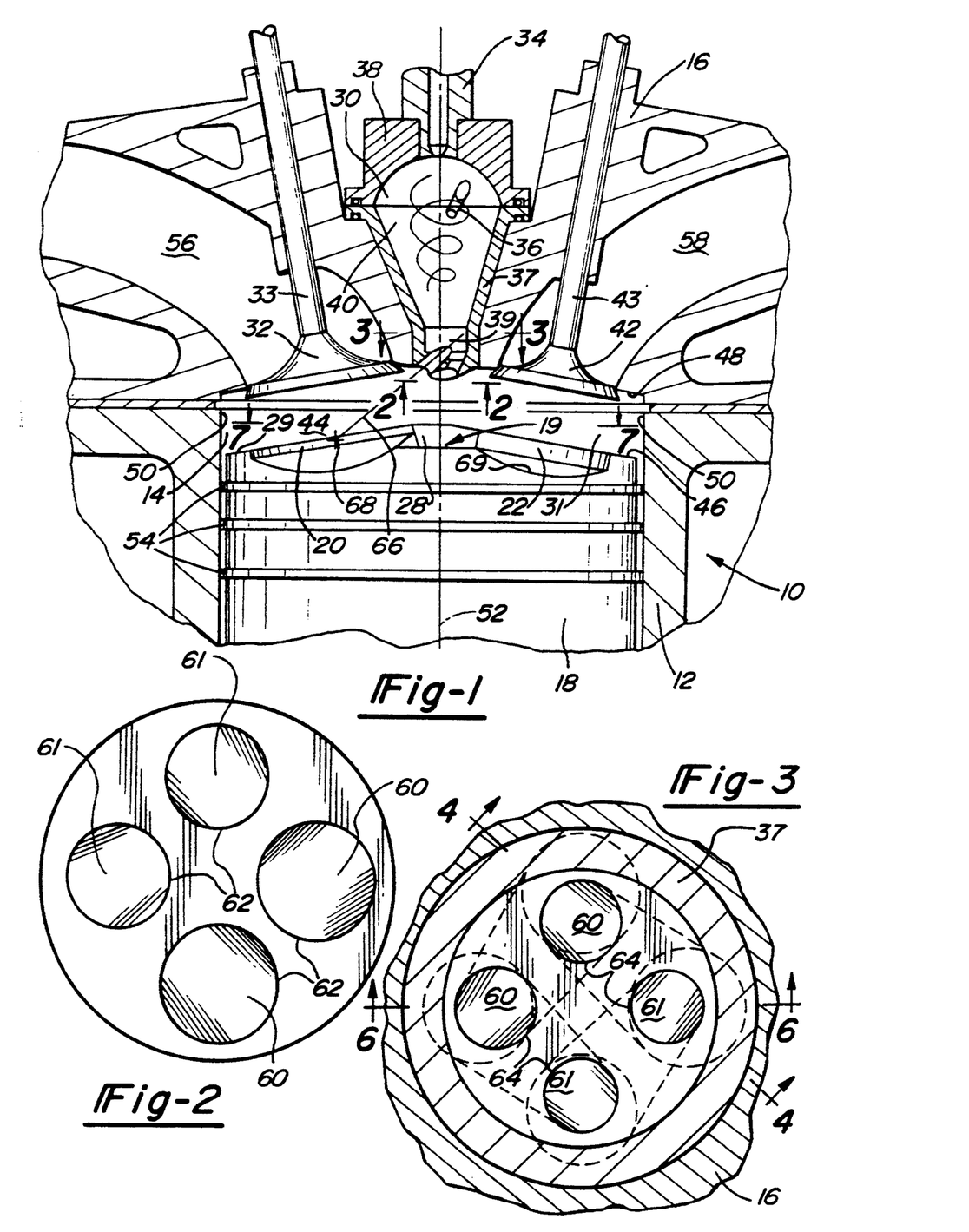
FIG. 1 is a segmented side elevational view of a cylinder and piston assembly for a diesel engine illustrating an embodiment of the invention.
FIG. 2 is a cross-sectional view taken along lines 2—2 in FIG. 1.
FIG. 3 is a cross-sectional view taken along lines 3—3 in FIG. 1.

Referring now to FIG. 1, an internal combustion engine 10 includes a cylinder head 16 and an engine block 12 with at least one cylinder 14 and at least one piston 18. Only one cylinder 14 and piston 18 are shown with the understanding that any other cylinder and piston in the engine 10 are substantially identical in structure and function, and therefore, are not individually described. A cylinder head 16 is mounted on block 12. Each piston 18 is conventionally connected to a crankshaft through piston pins and connecting rods. The crankshaft is connected via a timing mechanism (gears, chains or belts) to twin overhead camshafts that operate the intake valves 32 and exhaust valves 42. The connecting rods, crankshaft, timing mechanism, overhead camshafts and other typical valve train components are conventional and therefore for simplicity of the drawing are not illustrated.

A pair of intake valves 32 and exhaust valves 42 are associated with each cylinder 14. Reference to direction such as top, bottom, up, down, vertical, or horizontal will be made relating to the engine as shown in FIG. 1 with its conventional arrangement for a motor vehicle. It should be understood that the engine itself may be repositioned or reoriented such as rotated about its longitudinal or transverse axis without affecting the invention.

The cylinder 14, piston 18, and cylinder head 16 form a combustion chamber 44. The piston 18 has a top surface 46 that defines the bottom wall 46 of the chamber 44. The cylinder head 16 forms a top surface 48 of the chamber 44. The cylinder 14 and cylinder head 16 together form the side wall 50 of chamber 44. The longitudinal central axis of the cylinder 44 is indicated at 52. The piston 18 has a ring pack 54. The cylinder head 16 has intake ports 56 and exhaust ports 58 in communication with the respective pair of intake valves 32 and pair of exhaust valves 42. The valves 32 and 42 have a maximum valve included angle of less than 30° and is preferably approximately 25° as shown in FIG. 1.

Figure 7:
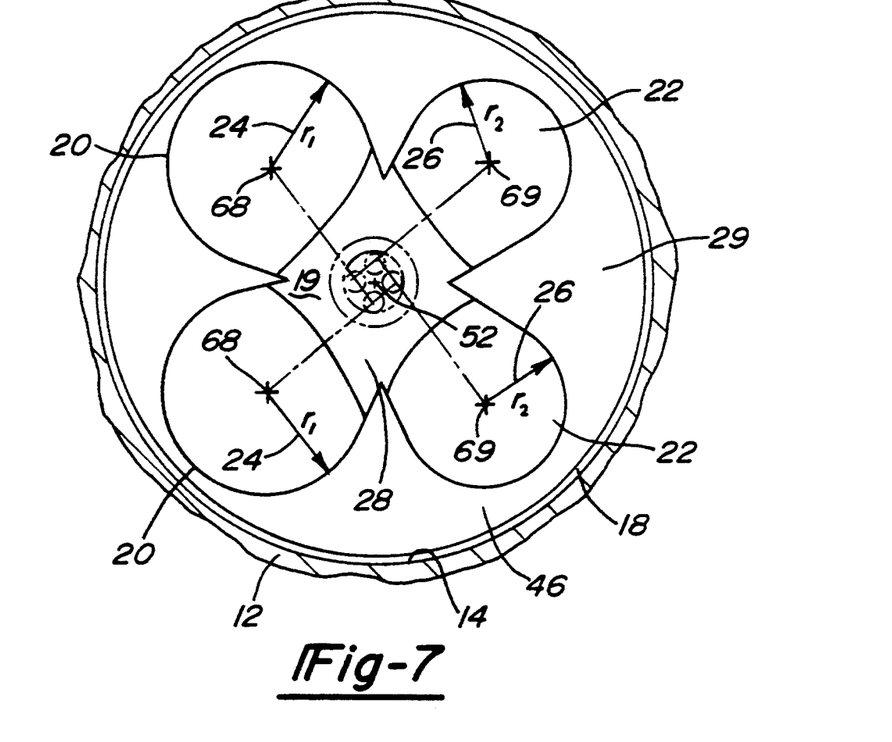
FIG. 7 is a cross-sectional view taken along lines 7—7 in FIG. 1 with the transfer passages shown in phantom.

As shown in FIGS. 1 and 7, the piston surface 46 is domed to conform to the pentroof angle of the head 16 and has a recessed area 19 that resembles a clover-leaf shape. The recessed area 19 has four recessed lobes 20 and 22 circumferentially spaced about central axis 52 as clearly shown in FIGS. 1 and 7 that function as valve pockets and as part of the combustion chamber. Two recessed lobes 20 have a radius 24. The recessed lobes 20 are located and sized to receive the intake valves 32 when the valves are in the partially open position and the piston 18 is near TDC. The other two recessed lobes 22 have a radius 26. The recessed lobes 22 are located and sized to receive the exhaust valves 42 when the valves 42 are in the partially opened position and the piston 18 is near TDC. Recessed lobes 20 are normally larger than recessed lobes 22. The outer periphery of each lobe 20 and 22 is deep enough to receive the respective valves when they are in a partially opened position during valve overlap, when the piston is at or near T.D.C. The stems 33 and 43 of the respective valves 32 and 42 are aligned with the centers 68 and 69 of the lobes 20 and 22 such that the valves 32 and 42 are received normal to the plane of the recessed lobes 20 and 22. The centers 68 and 69 may be concavely dished to be deeper than the peripheries of lobes 20 and 22. Recessed lobes 20 and 22 are joined in a common recessed center area 28 located about the central longitudinal axis 52. In general, recessed lobes 20 preferably have a larger volume than lobes 24. In the embodiment, the recessed lobes 20, 22 and central area are preferably all the same depth such that the volume of the lobes 20 is greater than the volume of lobes 22.

The piston periphery section 29 forms a squish area 31 of the combustion chamber 44 with the surface 48 of cylinder head 16. The squish area 31 allows more volume to be adjudicated to the lobes 20 and 22 and promotes rapid air motion into said volumes as the piston reaches TDC on its compression stroke for faster mixing and burning with the flames exiting out of the pre-chamber through the transfer passages (which have not yet been described).

A pre-combustion chamber 30 is also centrally located substantially along longitudinal axis 52. The chamber 30 is located above main combustion chamber 44 between the intake valves 32 and exhaust valves 42. The chamber 30 has a conventional fuel injector 34 operably mounted thereto preferably single-hole pintle type (but could also be outward opening full circumference). A conventional glow plug or other type of heating element 36 is also operably mounted to the pre-combustion chamber 30. The pre-combustion chamber 30 can be formed by a lower housing member 37 that is secured to the cylinder head 16. An upper housing member 38 is secured to the lower member. Alternatively, the chamber 30 may be formed from a single welded unit. The upper member 38 has the heating element 36 and injector 34 mounted therethrough. The pre-combustion chamber 30 has a generally circular cross-section along the horizontal direction. The pre-combustion chamber may be tapered to be narrower at the bottom section 39 than near its mid-section 40. The housing members may be made from a high strength high temperature resistant stainless steel.

Two transfer passages 60 and two transfer passages 61 pass through the lower member 37 between the main combustion chamber 44 and pre-combustion chamber 30. As shown in FIG. 2 and 3, the passages are circumferentially spaced about central longitudinal pre-chamber axis 52. Each passage 60 and 61 is tapered with its open lower-end 62 that faces the main chamber 44 being larger than the open upper-end 64 facing the pre-combustion chamber 30.

Figures 4, 5:
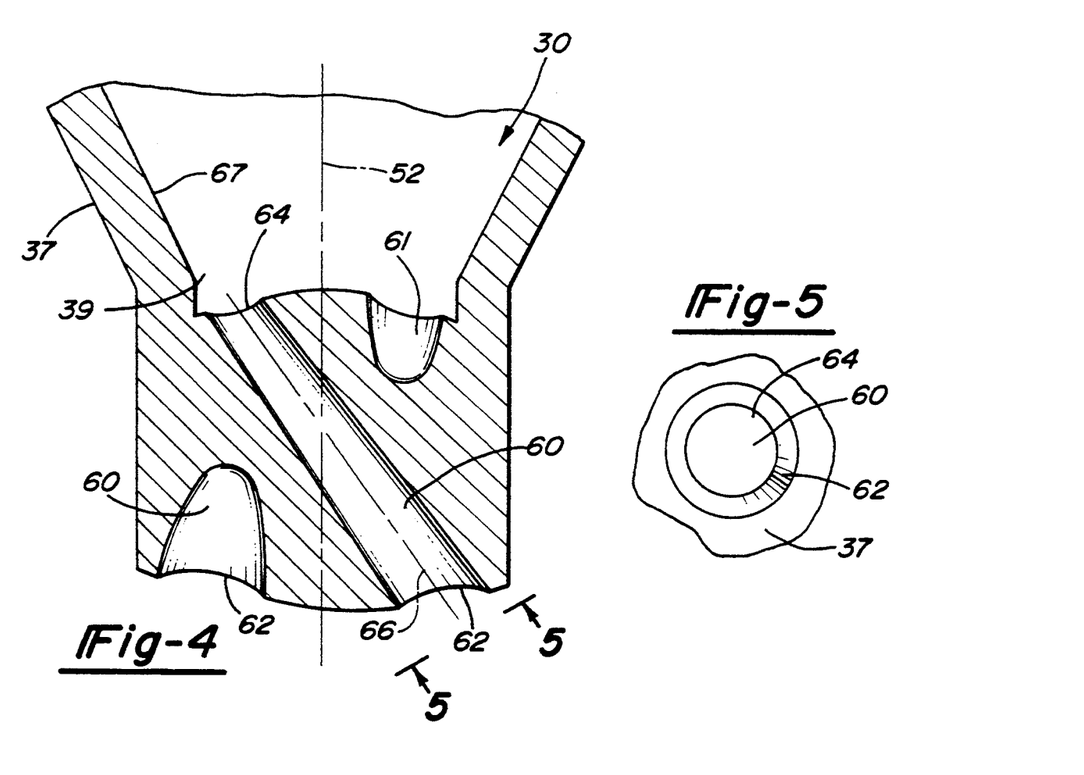
FIG. 4 is a cross-sectional view taken along lines 4—4 in FIG. 3.
FIG. 5 is a cross-sectional view taken along lines 5—5 in FIG. 4.

Each passage 60 and 61 is angled with respect to the central longitudinal axis 52 as shown in FIG. 4 such that the larger lower end 62 is spaced approximately 90° about the axis 52 relative to the smaller upper end 64. For manufacturing purposes, each passage 60 and 61 is straight as illustrated in FIGS. 4 and 5. However, the passages 60 and 61 need not be straight and may take the form of a helix partially wrapping about axis 52 for better air motion into the pre-cup and controls, reduces, or limits impingement of gasses upon the piston to prevent the operational plume of burning mass exiting the pre-combustion chamber from impinging too harshly on the piston-top. In other words, the inside and outside holes 64 and 62 are rotated with respect to each other when viewed along the longitudinal axis 52 so that the centerline of such passages projects to a point substantially near the center of the lobes when the piston is at TDC.

Figure 6:
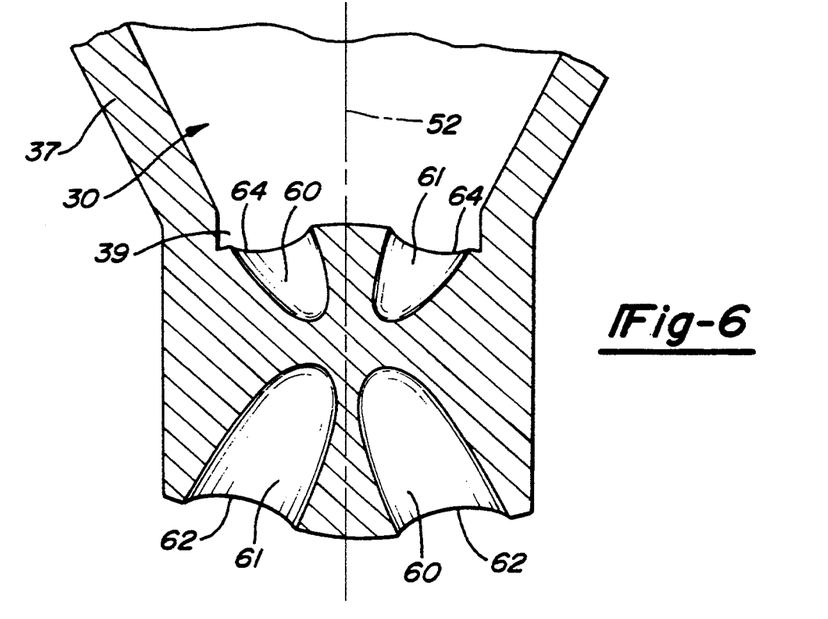
FIG. 6 is a cross-sectional view taken along lines 6—6 in FIG. 5.

In either the case of a straight passage or a helical passage, the central longitudinal axis 66 of each passage 60 and 61 at the upper end 64 is angled and positioned such that it is approximately tangential with the side wall 67 of the pre-combustion chamber 30. The longitudinal axis 66 of a respective passage 60 at the lower end 62 is also angled and positioned to intersect a respective center 68 of a lobe 20. The longitudinal axis of the passage 61 intersects a respective center 69 of lobe 22. As shown in FIG. 4 and 6, each passage 60 and 61 remains isolated from another passage 60 and 61 between the lower ends 62 and upper ends 64. One passage has a sightly larger diameter than the other passage because there should be more mixture in lobes 20.

In operation, at the end of the exhaust stroke and the beginning of the intake stroke, both the exhaust valves 42 and intake valves 32 may be partially opened during an overlap period. At this time, the piston 18 is at or near TDC and its periphery 29 forms squish area 31 with the upper chamber surface 48. The opening and closing of the valves is not affected because the valves 32 fit within lobes 20 and exhaust valves 42 fit within lobes 22.

During the intake stroke, the intake valves 32 fully open. The valves 32 are as large as practical to lessen any air resistance to provide the most air to enter the cylinder and increase the volumetric efficiency of the engine.

With four valves, intake valve closing is earlier compared to two valves due to the realities of life with valve dynamics (smaller, lighter valves, lower lift, shorter periods of operation). Also, by providing more valve overlap (i.e, earlier opening intakes) the intake valves can be closed much earlier than a two-valve engine and increase the effective compression ratio for greatly improved cold stability.

During the compression stroke, as the air is compressed, some of the air passes through the passages 60 and 61 into pre-combustion chamber 30. The passages 60 and 61 also cause heating of the air. The air is heated by two functions. Firstly, the air is heated as it is compressed into the small clearance volumes as the piston approaches TDC. During cold start, the end or tip of the pre-combustion chamber, as well as the mass of the chamber itself actually draws heat off from the air mass. However, the higher effective compression ratio compensates for the cold. The tapered converging shape of the pre-combustion chamber passages helps to fill the pre-chamber during the compression stroke with less pumping energy spent in the process, resulting in a smaller geometric volume of pre-chamber for the same air mass compressed into it. In effect, this results in a smaller, more efficient pre-chamber with less heat transfer wall area. The tangential nature of the axes 66 and the circular side wall 67 of the pre-combustion chamber 30 causes the air to undergo a swirling motion in the pre-combustion chamber 30. The heating of the air and swirling motion of the air in the pre-combustion chamber enhances the mixing, break-up and combustion of the fuel particles injected into the pre-combustion chamber. Air drawing heat off the passages during pre-chamber filling also cools them and helps their durability. Secondly, the air is also heated by having a plurality of passages 60 and 61 instead of one, the surface-to-flow area is increased relative to one larger passage. The air draws heat off the hottest part of the engine, namely the center of the combustion chamber near the lower open ends 62.

The heating element 36 is actuated as needed. At sufficient compression, the fuel-air mixture within the pre-combustion chamber ignites. The smaller explosion relative to open-chamber diesels reduces the initial diesel knock commonly associated with diesel engines. As the injection of fuel continues, combustion proceeds with the hot combustion mixture and fuel passing backdown through the passages 60 and 61 and aimed toward the respective centers 68 and 69 of respective recessed lobes 20 and 22 where the combustion or burn continues. The divergent lower end of the passages 60 and 61 produces a spread of the flame and reduces its penetration for more coverage of the pocket area and better mixing so as to provide quicker and cleaner burning while wasting less pumping energy. The differing direction and shallow or acute angle of each longitudinal axis 66 at lower end 62 alleviates the torch-like effect of previous pre-combustion chambers. The flame plume stays airborne and a minimum possible amount of flame impinges directly and harshly against the top of the piston.

The intake valves 32 are normally cooler than the exhaust valves 42 due to the fact that cool intake air passes through the intake valves 32 during the intake stroke while on the other hand hot exhaust gases are constantly heating the exhaust valves 42 during the exhaust cycle. The air within the two lobes 20 is closer to the cooler intake valves 32 than the air within the two lobes 22. Consequently, the air within the lobes 20 is denser and cooler than the air in the two lobes 22.

It is desired that the lobes 20 be larger than the lobes 22 to take further advantage of the thermal differences between the lobes 20 and 22. Passages 60 that are aimed at the lobes 20 have a larger diameter than the passages 61 aimed at the lobes 22 to provide more flame and fuel to the larger lobes 20 relative to the flame and fuel passing through the smaller passages to lobes 22. The difference in diameter is schematically emphasized in FIGS. 2 and 3. The air-tumble motion naturally provided by the twin intake valves on one side of the combustion chamber, which is maintained during the compression stroke, moves in a counterflow direction against the flame and against fuel passing through the larger passages 60, aimed at the lobes 20. This action also contributes to improve the mixing in the cylinder of the fuel with the air and such flames. This results in enhanced combustion velocity. The fastest combustion is then produced with the lowest thermal loading on any section of the piston to prevent heat checking and cracking of the piston crown.

The decreased thermal loading may help, in some cases, to eliminate the need for piston cooling oil jets which produces significant savings in both engine production costs and engine operating costs. It is known that piston cooling oil jets contribute to increase ring and piston friction as well as oil consumption. The elimination of the cooling jets can provide for improved piston oil drainage and reduced oil consumption. Secondly, the oil pump may be reduced in size and the power demand of the oil pump is reduced.

A significant increase in power, fuel efficiency and a decrease in specific NOx and HC, ring and cylinder wall wear, and weight are a result of applicant's pre-combustion chamber and piston design which provides for more efficient combustion and thermal loading.

The combination of the pre-combustion chamber, piston with recessed valve-receiving pockets and multi-valve porting of each cylinder provides for a diesel engine which can be easily modified for specific applications. Due to the redundancies built into the design in allowing shorter durations of valve opening or allowing earlier valve openings into the piston pockets and thus earlier closures, the combustion process can be optimized in a variety of ways. In all cases, startability and emissions during and immediately following cold start are greatly improved.

Variations and modifications such as turbo-charging are possible without departing from the scope and spirit of the present invention as defined by the appended claims.

The embodiments in which an exclusive property or privilege is claimed are defined as follows:

1. In an internal combustion engine having a cylinder and a piston movably disposed in said cylinder for reciprocal motion, a cylinder head secured over said cylinder and piston to form a combustion chamber, at least one intake port extending in said cylinder head and at least two intake valves mounted in said cylinder head for allowing air to be admitted into said combustion chamber, at least one exhaust port extending through said cylinder head and at least two exhaust valves mounted to said cylinder head for allowing exhaust gases to exit said combustion chamber, said set of intake and exhaust valves mounted longitudinally spaced apart along said engine and positioned laterally apart said valves being driven by laterally spaced apart twin overhead camshafts, and a pre-combustion chamber housing an injector and a heating element the improvement characterized by:

said pre-combustion chamber having a plurality of tapered transfer passages communicating with said combustion chamber with a narrow open end of said passages being in proximity to said pre-combustion chamber and a wide open end of said passages being in proximity to said combustion chamber;

said tapered transfer passages being circumferentially spaced about a centerline of said pre-combustion chamber;

said centerline of said pre-combustion chamber being approximately aligned with a centerline of said combustion chamber;

said piston has a plurality of recessed lobes circumferentially spaced about a central axis of said piston;

the longitudinal axis of each passage being inclined with respect to said centerline and at said wide open end being aligned approximately with a center of a respective recessed lobe in said piston and canted with respect to the upper surface of said piston at an acute angle.

2. An internal combustion engine as defined in claim 1 further characterized by:

said narrow open end of a respective passage being rotated about said centerline of said pre-combustion chamber with respect to said wide open end of said respective passage to provide rotation of air about said centerline.

3. An internal combustion engine as defined in claim 2 further characterized by:

said narrow open end of a respective passage being rotated about said centerline of said pre-combustion chamber approximately 90° from said wide open end of said respective passage.

4. An internal combustion engine as defined in claim 1 further characterized by;

each intake and exhaust valve being substantially vertically aligned over a respective recessed lobe and sized to fit within said recessed lobe when in a partially opened position and when said piston is near TDC.

5. An internal combustion engine as defined in claim 4 further characterized by;
said passages aligned with said center of said recessed lobes under said respective intake valves having a greater diameter than said passages aligned with said recessed lobes under said respective exhaust valve.

6. An internal combustion engine as defined in claim 4 further characterized by;
the respective recessed lobe aligned under said respective intake valve being larger than the respective recessed lobe aligned under said respective exhaust valve.

7. An internal combustion engine as defined in claim 6 further characterized by;
said passages aligned with said center of said recessed lobes under said respective intake valves having a greater diameter than said passages aligned with said recessed lobes under said respective exhaust valve.

8. A pre-combustion chamber for an internal combustion engine characterized by:
a housing having an interior forming said pre-combustion chamber;
a plurality of passages through said housing for communicating said pre-combustion chamber with a main chamber of said engine;
said passages being circumferentially spaced about a centerline of said pre-combustion chamber and having its longitudinal axis inclined with respect to said centerline;
said plurality of passages having a narrow open end of said passages being in proximity to said pre-combustion chamber and a wide open end of said passages facing an exterior of said housing;
said narrow open end of a respective passage being rotated about said centerline of said pre-combustion chamber approximately 90° from said wide open end of said respective passage.

9. In an internal combustion engine having a cylinder and a piston movably disposed in said cylinder for reciprocal motion, a cylinder head secured over said cylinder and piston to form a combustion chamber, at least one intake port extending through said cylinder head and at least two intake valves mounted in said cylinder head for allowing air to be admitted into said combustion chamber, at least one exhaust port extending through said cylinder head and two exhaust valves mounted to said cylinder head for allowing exhaust gases to exit said combustion chamber, and a pre-combustion chamber housing an injector and a heating element, the improvement characterized by:
said pre-combustion chamber having a plurality of transfer passages communicating with said combustion chamber with a first open end of said passages being in proximity to said pre-combustion chamber and a second open end of said passages being in proximity to said combustion chamber;
said transfer passages being circumferentially spaced about a centerline of said pre-combustion chamber; and having a respective longitudinal axis of each passage inclined with respect to said centerline;
said first open end of a respective passage being rotated about said centerline of said pre-combustion chamber with respect to said second open end of said respective passage;
said centerline of said pre-combustion chamber being approximately aligned with a centerline of said combustion chamber;
said piston has a plurality of recessed lobes circumferentially spaced about a central axis of said piston;
said recessed lobes having a substantially flat bottom;
the longitudinal axis of each passage at said second open end aligned with a center of a respective recessed lobe in said piston and canted with respect to the upper surface of said piston at an acute angle.

10. An internal combustion engine as defined in claim 9 further characterized by:
said first open end of a respective passage being rotated about said centerline of said pre-combustion chamber with respect to said second open end of said respective passage to provide rotation of air about said centerline.

11. An internal combustion engine as defined in claim 10 further characterized by:
said first open-end of a respective passage being rotated about said centerline of said pre-combustion chamber approximately 90° from said second open-end of said respective passage.

12. An internal combustion engine as defined in claim 9 further characterized by;
each intake and exhaust valve being substantially vertically aligned over a respective recessed lobe and sized to fit within said respective recessed lobe when in a partially opened position and when said piston is near TDC.

13. An internal combustion engine as defined in claim 12 further characterized by;
the respective recessed lobe aligned under said respective intake valve being larger than the respective recessed lobe aligned under said respective exhaust valve.

14. An internal combustion engine as defined in claim 13 further characterized by;
said passages aligned with said center of said recessed lobes under said respective intake valves having a greater diameter that said passages aligned with said recessed lobes under said respective exhaust valve.

15. An internal combustion engine as defined in claim 12 further characterized by;
said passages aligned with said center of said recessed lobes under said respective intake valves having a greater diameter that said passages aligned with said recessed lobes under said respective exhaust valve.

16. In an internal combustion engine having a cylinder and a piston movably disposed in said cylinder for reciprocal motion, a cylinder head secured over said cylinder and piston to form a combustion chamber, at least one intake port extending through said cylinder head and at least two intake valves mounted in said cylinder head for allowing air to be admitted into said combustion chamber, at least one exhaust port extending through said cylinder head and at least two exhaust valves mounted to said cylinder head for allowing exhaust gases to exit said combustion chamber, said set of intake and exhaust valves mounted longitudinally along the engine centerline and on each side of it, said valves being driven by twin overhead camshafts, and a precombustion chamber housing an injector and a heating element; the improvement characterized by:

said pre-combustion chamber having a plurality of tapered transfer passages communicating with said combustion chamber with a narrow open end of said passages being in proximity to said pre-combustion chamber and a wide open end of said passages being in proximity to said combustion chamber;

said tapered transfer passages being circumferentially spaced about a centerline of said pre-combustion chamber and having its longitudinal axis inclined with respect to said centerline to provide rotation of air about said centerline;

said centerline of said pre-combustion chamber being approximately aligned with a centerline of said combustion chamber;

said narrow open end of a respective passage being rotated about said centerline of said pre-combustion chamber approximately 90° from said wide open end of said respective passage.

17. In an internal combustion engine having a cylinder and a piston movably disposed in said cylinder for reciprocal motion, a cylinder head secured over said cylinder and piston to form a combustion chamber, at least one intake port extending through said cylinder head and at least two intake valves mounted in said cylinder head for allowing air to be admitted into said combustion chamber, at least one exhaust port extending through said cylinder head and two exhaust valves mounted to said cylinder head for allowing exhaust gases to exit said combustion chamber, and a pre-combustion chamber housing an injection and heating element, the improvement characterized by:

said pre-combustion chamber having a plurality of transfer passages communicating with said combustion chamber with a first open end of said passages being in proximity to said pre-combustion chamber and a second open end of said passages being in proximity to said combustion chamber;

said transfer passages being circumferentially spaced about a centerline of said pre-combustion chamber and having a respective longitudinal axis of each passage included with respect to said centerline to provide rotation of air about said centerline;

said centerline of said pre-combustion chamber being approximately aligned with a centerline of said combustion chamber;

said first open-end of a respective passage being rotated about said centerline of said pre-combustion chamber approximately 90° from said second open-end of said respective passage.

* * * * *